United States Patent [19]

Waltman

[11] 3,947,709

[45] Mar. 30, 1976

[54] PROTECTOR FOR SUBMERSIBLE ELECTRIC MOTORS

[75] Inventor: Robert E. Waltman, Baton Rouge, La.

[73] Assignee: Ethyl Corporation, Richmond, Va.

[22] Filed: June 20, 1974

[21] Appl. No.: 481,131

[52] U.S. Cl. .................................. 310/87; 340/8 PC

[51] Int. Cl.[2] .......................................... H02K 5/12

[58] Field of Search ........... 318/87, 273, 86, 42, 88, 318/66, 85, 67; 175/327, 263; 340/8 PC; 184/6.4

[56] References Cited

UNITED STATES PATENTS

| | | | |
|---|---|---|---|
| 2,194,561 | 3/1940 | Mason | 310/87 |
| 2,218,937 | 10/1940 | Myers | 310/87 |
| 2,703,371 | 3/1955 | Wightman | 310/87 |
| 2,854,595 | 9/1958 | Arutunoff | 310/87 |
| 2,922,055 | 1/1960 | Deters | 310/87 |
| 3,052,804 | 9/1962 | Komor | 310/87 |
| 3,108,247 | 10/1963 | Harris | 340/8 PC |
| 3,116,432 | 12/1963 | Ekey | 310/87 |
| 3,263,208 | 7/1966 | Douglas | 340/8 PC |
| 3,475,634 | 10/1969 | Bogdanov | 310/87 |
| 3,671,786 | 6/1972 | Jones | 310/87 |

*Primary Examiner*—R. Skudy
*Attorney, Agent, or Firm*—Donald L. Johnson; John F. Sieberth; Edgar E. Spielman, Jr.

[57] ABSTRACT

A protector for liquid-filled, submersible electric motors is provided. The protector has a resiliently deformable, liquid-filled reservoir which is attached to the housing of the electric motor. The motor liquid and the reservoir liquid are communicated at the attachment. The protector compensates for volume changes of the motor liquid, due to heating or cooling thereof, by expansion or contraction of the deformable reservoir. By compensating for motor liquid volume changes, internal motor parts are protected and isolated from external fluids.

15 Claims, 4 Drawing Figures

PROTECTOR FOR SUBMERSIBLE ELECTRIC MOTORS

BACKGROUND OF THE INVENTION

In the drilling of wells the recovery of liquids from the bottom of the well is usually achieved by either the use of pressure to push the liquid to the well head or by pumping the liquid to the well head. When pumping is utilized the pump itself is lowered down into the well below the liquid level. The motors for driving the pumps can be either located near the well surface or can themselves be lowered into the liquid at the bottom of the well hole. If the pump-driving motors are submerged into the liquid, as is most commonly done, problems of motor corrosion can become acute. This is especially true for those wells which contain corrosive materials such as $H_2S$.

The submersible pump motors are generally filled with lubricating fluid and have construction for providing protection against seepage of the corrosive well liquid into the motor interior. Some protection against seepage is obtained by the use of mechanical seals. Unfortunately, such seals are not a panacea for the seepage problems and motor failure will still occur. This is due in part to the change in volume of the luricating liquid in the motor as motor temperatures rise and fall. When the motor temperature rises, because of motor friction and high well temperatures, the volume of the lubricating liquid increases which causes seepage of the liquid out through the motor seals into the well itself. At this point entrance of corrosive well fluids into the interior of the motor is not large. However, when the motor temperature falls, the lubricating liquid volume decreases causing a "suction" which pulls corrosive well fluids through the motor seals into the motor. When this occurs, in wells containing $H_2S$ for example, the sulfide will readily emulsify or dissolve into the lubricating liquid and contact the copper motor windings resulting in corrosion of the windings. As the windings become badly corroded the motor "shorts out" therefore terminating motor life.

Rubber or synthetic rubber-like diaphrams attached to the motor housing have been used to compensate for expansion and contraction of the lubricating liquid to provide seal protection. However the use of such diaphrams is not an entirely satisfactory solution in wells which operate at high temperatures or which contain hydrocarbons as these diaphrams tend to deteriorate under such conditions and fail. Failure of the diaphrams results in a flooding of the electric motor with corrosive material and destruction of the motor.

Attempts at providing protection against seepage have also been made by providing an interface between the lubricating liquid and the well liquid in a chamber remote from the motor interior. By maintaining such an interface, contact between corrosive materials in the well liquid and the motor interior will be prevented provided the corrosive material is not soluble in the lubricating liquid. If there is solubility of corrosive material, as is the case with $H_2S$, maintenance of the interface is of little value for insuring long motor life.

Therefore it is an object of this invention to provide an apparatus which protects and isolates submersible electric motors from corrosion over a wide range of well conditions.

THE INVENTION

The apparatus of this invention provides for corrosion protection for liquid-filled, submersible, electric motors. The apparatus includes; a liquid-filled, resiliently deformable reservoir; and an attaching mechanism for attaching the reservoir to the electric motor housing and for achieving communication between the reservoir liquid and the lubricating liquid. Preferably, the deformable reservoir is a cylindrical metal bellows. An optional and preferred variation of the apparatus of this invention is the apparatus as defined above additionally having a reservoir shield which at least partially surrounds and encloses the reservoir. The shield protects the reservoir from impact damage as the apparatus and motor are lowered into the well hole. When using the preferred cylindrical metal bellows a cylindrical shield with the bellows annularly positioned therein is preferably used. The shield may also be filled with liquid to provide a bath in which the liquid-filled reservoir will sit. By surrounding the reservoir with liquid, permanent deformation of the reservoir due to the weight of the reservoir liquid and installation dynamics will less likely occur. Once the apparatus has lowered into the well, a temporary seal built into the shield will break thus allowing well liquid and shield liquid to be in communication. This communication allows well pressure to be "felt" by the reservoir.

These and other features of this invention contributing satisfaction in use and economy in manufacture will be more fully understood from the following description of a preferred embodiment of this invention when taken in connection with the accompanying drawings in which identical numerals refer to identical parts and in which.

Figure 1:
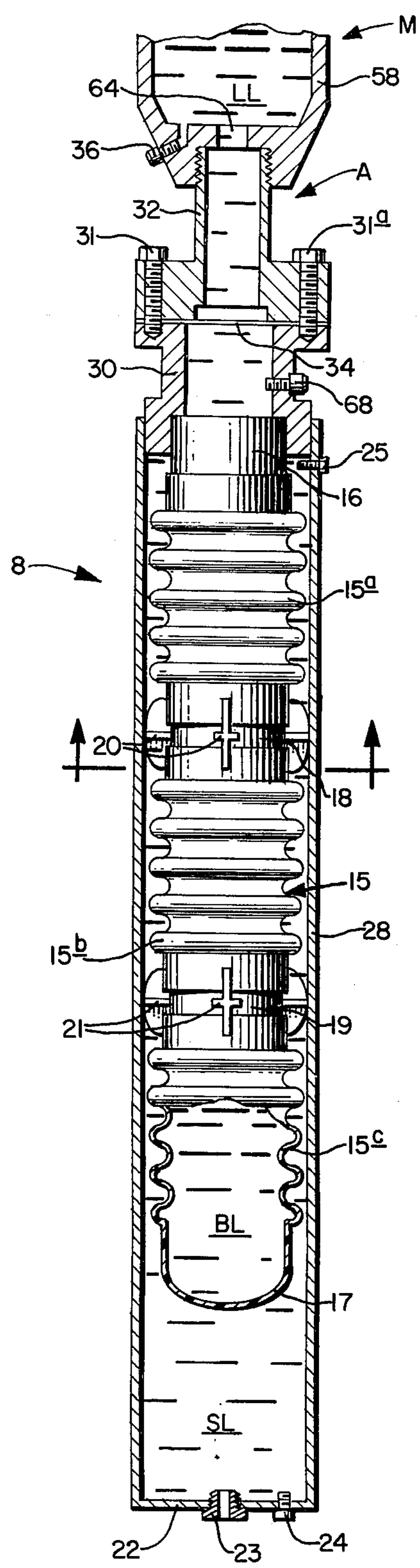
FIG. 1 is an elevational view, partially in section, showing an apparatus of this invention connected to the lower portion of an electric motor housing.
Figure 2:
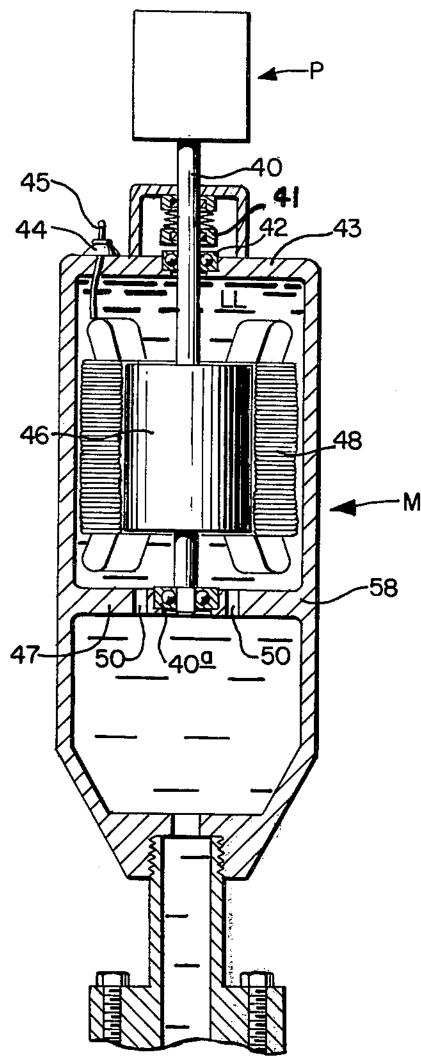
FIG. 2 is a partial elevational, sectional view showing a submersible, liquid-filled electric motor connected at its upper end to a pump and at its lower end to an apparatus of this invention.
Figure 3:
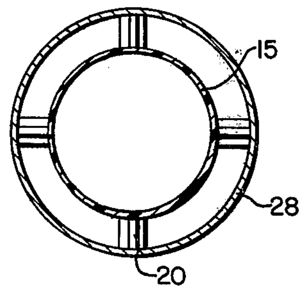
FIG. 3 is a cross-sectional view taken along lines 3—3 in FIG. 1.

Referring now to FIGS. 1–3, it can be seen that a submersible, liquid-filled electric motor, generally designated by the letter M, is attached to a motor protector of this invention, generally designated by the numeral 8, by means of an attachment apparatus, generally designated by the letter A. Motor protector 8 includes a liquid-filled bellows 15 surrounded by a liquid-filled bellows shield 28.

FIG. 1 illustrates a bellows made up of three generally cylindrical bellows sections, an upper section **15*a*, a central section 15*b* and a lower section 15*c*. Upper bellows section 15*a* has welded to its upper end hollow pipe nipple 16, while bellows section 15*c* has welded to its lower end pipe cap 17. Central bellows section 15*b* interconnects upper bellows sections 15*a* and lower bellows section 15*c* by way of welded hollow pipe nipples 18 and 19**. Since the protector of this invention prevents leakage of well fluids into the motor housing by compensating for increases and decreases in the volume of the lubricating liquid in the motor housing, the number of bellows sections used will vary. The number used is dependent upon the resilient deformation characteristics of the materials of construction, the total volume of lubricating fluid in the motor, the difference between the ambient temperature and the motor operating temperature, and upon the cross-sectional area of the bellows. For example, if the temperature difference is great and the material of construction is relatively "stiff" a greater number of bellows sections will be required to accommodate the volume increase of the lubricating liquid. If the cross-sectional area of the bellows is large, then less bellows sections will be required as a small extension of the bellows length will accomodate sufficient volume to make up for volume changes in the lubricating liquid. As a specific example, if the temperature difference is about 200°F, the bellows effective cross-sectional area is 27 $in^2$ and the bellows material is of Monel, then seven bellows sections having an expansion capacity of about 20.0 inches is suitable. Use of bellows having other cross-sectional areas, lengths and materials of construction for particular temperature differences can readily be determined by one skilled in the art by simple trial and error experimentation. Materials of construction for bellows other than that mentioned above may, of course, be used. The only requirement for the material is that it be resistant to the type of corrosion found in the well and is resiliently deformable. Exemplary of suitable materials are stainless steel, Inconel and Monel. A preferred material for use in wells in which the corrosive material is $H_2S$, is Monel.

To aid in guiding the bellows as it expands and contracts within bellows shield 28 spaced apart, radially extending bellows guides 20 and 21 are provided. These radially extending guides are welded to pipe nipples 18 and 19 respectively whereby their outer ends make slidable contact with the inner wall of bellows shield 28.

As before said, bellows shield 28 at least partially surrounds bellows 15. As is illustrated in FIG. 3, bellows 15 is preferably centrally positioned within bellows shield 28. (Shield 28 is illustrated in its preferred form, i.e., a hollow cylinder). The bottom wall 22 of bellows shield 28 has two apertures therein. One of the apertures receives destructible plug 23. The other aperture holds a fill value 24. Destructible plug 23 may be a fusible plug which has a low melting point so that upon lowering of the pump P, motor M, and protector 8 into the well, the temperature of the liquid in the well will melt the plug so that the well liquid will be in communication with shield liquid SL. This liquid-liquid communication is necessary so that the well pressure can be transferred to the bellows which will transfer the same to the lubricating liquid in the motor housing 58. The plug may be made of metal or metals having a melting point of at least 100°F, e.g., Wood's metal. Of course destructible plug 23 can also be a plug which will destruct by dissolving in the well liquid rather than by melting.

In some instances it may be desirable not to fill shield 28 with shield liquid and in these cases the use of bottom wall 22 is not necessary. The use, however, of shield liquid SL is generally desirable as it acts to dampen any shocks felt by liquid-filled bellows 15 during lowering of the protector 8, motor M, and pump P into the well. Another function of shield liquid SL is to prevent the weight of bellows liquid BL from causing damaging deformation to bellows 15 prior to insertion into the well.

Shield Liquid SL is introduced into shield 28 by way of fill valve 24. Air vent 25 is open during filling and is closed after shield liquid SL escapes therethrough. Fill valve 68 is used to fill bellows 15 with bellows liquid BL.

Bellows shield 28 is welded to the outside of hollow bellows flange 30 while pipe nipple 16 is welded to the interior of hollow bellows flange 30. Hollow bellows flange 30 also carries bellows fill valve 68. Hollow bellows flange 30 is connected to motor housing flange 32 by means of bolts 31 and 31*a*. Gasket 34 is used to insure a liquid-tight fit between the flanges. As can be seen from the drawings, motor housing flange 32 is hollow and its reduced diameter upper end screws into the bottom of motor housing 58. The hollow upper end of motor housing flange 32 communicates with housing aperture 64. As can be understood, housing aperture 64 and hollow flanges 30 and 32 allow for communication of bellows liquid BL and lubricating liquid LL. As can be seen in FIG. 2, lubricating liquid in the upper portion of motor housing 58 is communicated with lubricating liquid LL in the bottom portion of motor housing 58 by way of motor ports 50 provided in transverse wall 47. Drain plug 36 is also connected to motor housing 58 to facilitate draining of lubricating liquid for maintenance purposes.

FIG. 2 shows pump P, which may be any type submersible pump, being connected by means of shaft 40 which is held by mechanical seal 41 and bearing 42, the latter being received in an aperture provided in the top 43 of motor housing 58. Electric power is transmitted to the interior of electric motor M by way of an electrical conduit 45 sealed by means of a plug 44. At the bottom portion of shaft 40 is a bearing 40*a* which is received in a central opening in wall 47. The bearing is designed to carry the weight of the rotor 46, wire winding 48, plus any additional weight placed on the shaft. The pump P is connected to the well head (not shown) by suitable well tubing (not shown).

Figure 4:
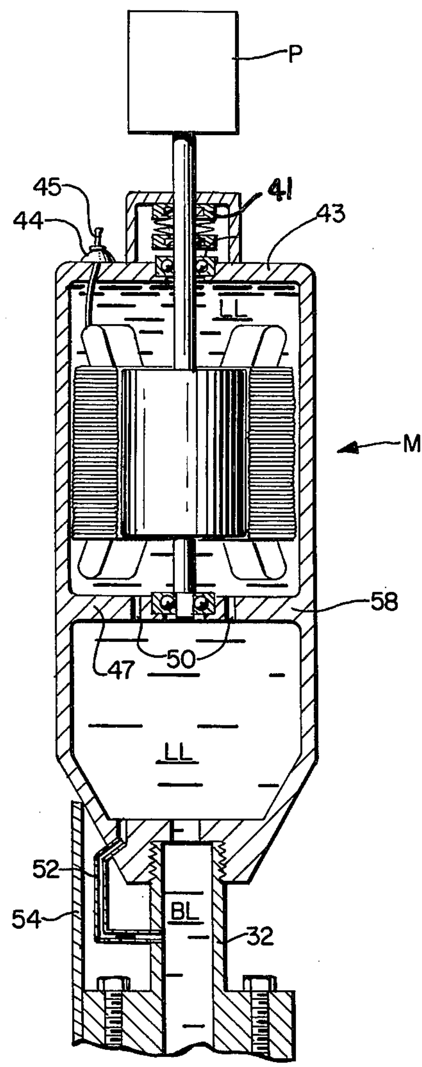
FIG. 4 is a partial elevational, sectional view showing another embodiment of the apparatus of this invention.

FIG. 4 illustrates a variation in the mode used to communicate lubricating liquid LL with bellows liquid BL. In this mode communication is achieved by providing a lubricating liquid pipe 52, which connects the interior of hollow motor flange 32 with the hollow interior of motor housing 58. A piping protector plate 54 is attached by welding or other suitable means to the motor housing 58 and to motor flange 32 to prevent damage to pipe 52.

It should be realized that the electric motor illustrated in the drawings is only one of many designs for submersible liquid-filled electric motors which may be used with the protector of this invention. Adaptation of the motor housing flange may be necessary for electric motors having other designs than that illustrated in the drawings but such adaptation is readily within the skill of those skilled in the art.

In operation the preferred mode of using the protector of this invention is to first connect the protector to the motor housing and then to fill the shield with liquid if desired. The shield liquid SL can be any suitable liquid which will not boil at well temperatures and is preferably miscible with well liquids. The bellows is then filled with bellows liquid BL which is the same as the lubricating liquid LL, usually hydrocarbon oil, used in the electric motor. The electric motor is then filled to capacity with lubricating liquid LL. LL can also be a silicone base oil.

The advantages of utilizing the protector of this invention are twofold. First, the protector completely separates the motor from contact with well fluid while allowing for contraction and expansion of the lubricating liquid in the electric motor so that volume increases of this liquid will not damage motor seals. By not damaging motor seals, of course, well liquids are kept from the interior of the motor thereby reducing corrosive damage thereto. Another advantage is that since the bellows is resilient, it offers a slight spring pressure against the bellows liquid which is transmitted to the lubricating liquid thereby maintaining a small positive pressure inside of the motor. This small positive pressure will aid in preventing entrance of well liquid into the motor should slight motor seal leakage occur.

A further advantage is found in that the protector-isolator assembly provides a large surface area over which well fluid passes while the pump is running. This surface provides an increased heat transfer area which allows the motor to operate at a relatively lower temperature which temperature extends motor life.

Although detail has been shown and described herein above for two embodiments of this invention, it is to be understood that various modifications and substitutions may be made by those skilled in the art without departing from the spirit and scope of the present invention.

What is claimed is:

1. An apparatus for protecting, from corrosive fluids, submersible electric motors which are filled with lubricating liquid which includes:

a. a reservoir shield means being filled with a reservoir shield liquid and having an upper end and a lower end, said upper end being permanently sealed to prevent reservoir shield liquid leakage from said upper end and said lower end being temporarily sealed to prevent reservoir shield liquid leakage from said lower end prior to insertion of said shield means in said corrosive fluids, said temporary seal being a destructible plug which will destruct when said insertion occurs so that said reservoir liquid and said corrosive fluids will be communicative one with the other;

b. a liquid-filled, resiliently deformable reservoir means within said reservoir shield means; and c. an attaching means for attaching said reservoir means to said electric motor housing and for achieving communication between said reservoir liquid and said lubricating liquid.

2. The apparatus of claim 1 wherein said reservoir means is a bellows.

3. The apparatus of claim 1 wherein said reservoir means is a cylindrical bellows.

4. The apparatus of claim 3 wherein said reservoir shield means is a hollow cylinder within which said cylindrical bellows is centrally positioned.

5. The apparatus of claim 2 wherein said destructible plug is a fusible metal which melts at a temperature above about 100°C.

6. The apparatus of claim 1 wherein said lubricating liquid and said reservoir liquid are hydrocarbon oil.

7. The apparatus of claim 1 wherein said destructible plug is a fusible metal which melts at a temperature above about 100°F.

8. The apparatus of claim 1 wherein said reservoir means is a metal bellows.

9. The apparatus of claim 8 wherein said metal bellows is made of Monel.

10. The apparatus of claim 8 wherein said metal bellows is a cylindrical metal bellows.

11. The apparatus of claim 1o wherein said reservoir shield means is a hollow cylinder within which said cylindrical metal bellows is centrally positioned.

12. The apparatus of claim 11 wherein said destructible plug is a fusible metal which melts at a temperature above about 100°F.

13. The apparatus of claim 11 wherein said cylindrical metal bellows has attached to the outer surface thereof spaced apart, radially extending bellows guides which slidably contact said hollow cylinder whereby said cylindrical metal bellows is maintained in axial alignment within said hollow cylinder shield means.

14. The apparatus of claim 13 wherein said destructible plug is a fusible metal which melts at a temperature above about 100°F.

15. The apparatus of claim 14 wherein said lubricating liquid and said reservoir liquid are hydrocarbon oil.

* * * * *

UNITED STATES PATENT OFFICE

CERTIFICATE OF CORRECTION

PATENT NO. : 3,947,709

DATED : March 30, 1976

INVENTOR(S) : Robert E. Waltman

It is certified that error appears in the above-identified patent and that said Letters Patent are hereby corrected as shown below:

Col. 5, line 41 reads "reservoir liquid" and should read --reservoir shield liquid--. Col. 6, line 14 reads "100°C° and should read --100°F--.

Signed and Sealed this

Seventh Day of June 1977

[SEAL]

*Attest:*

RUTH C. MASON
*Attesting Officer*

C. MARSHALL DANN
*Commissioner of Patents and Trademarks*